(No Model.)
T. C. DURHAM.
HARROW OR CULTIVATOR.
No. 492,717. Patented Feb. 28, 1893.
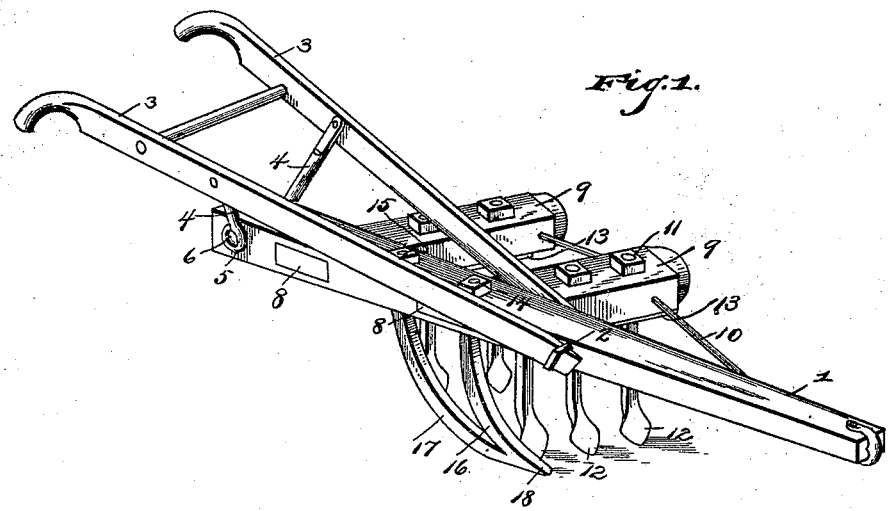
Fig. 1.
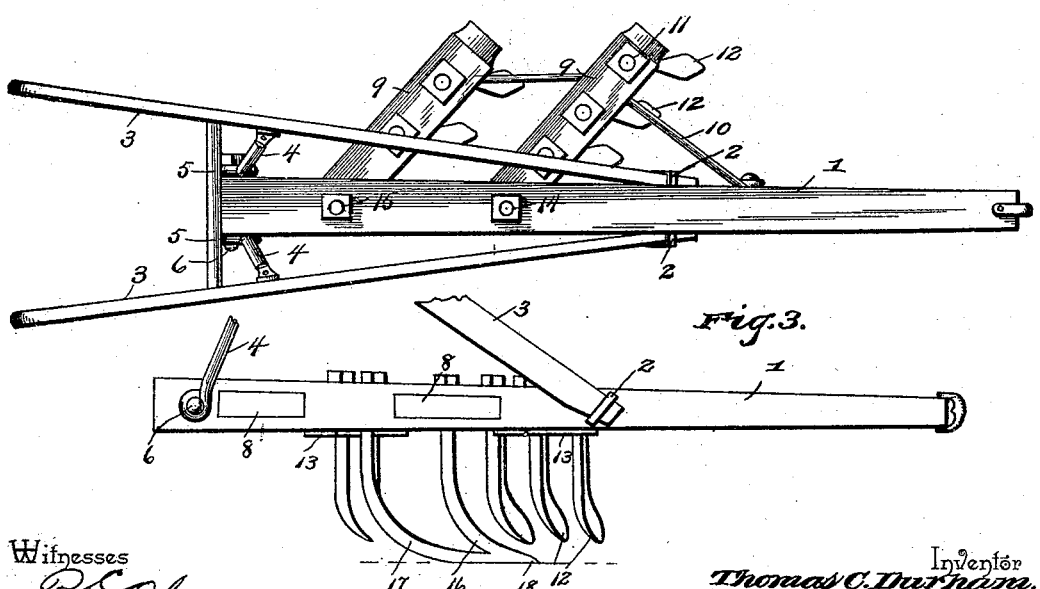
Fig. 2.
Fig. 3.
Witnesses
Inventor
Thomas C. Durham,
By his Attorneys,
C. A. Snow & Co.

UNITED STATES PATENT OFFICE.

THOMAS CALVIN DURHAM, OF GATES, TENNESSEE.

HARROW OR CULTIVATOR.

SPECIFICATION forming part of Letters Patent No. 492,717, dated February 28, 1893.

Application filed October 22, 1892. Serial No. 449,654. (No model.)

*To all whom it may concern:*

Be it known that I, THOMAS CALVIN DURHAM, a citizen of the United States, residing at Gates, in the county of Lauderdale and State of Tennessee, have invented a new and useful Harrow or Cultivator, of which the following is a specification.

My invention relates to improvements in harrows or cultivators, of that class employing a main longitudinal beam and at one side thereof a series of harrow-bars projecting laterally from the beam.

The objects of my invention, are, to so arrange or dispose these harrow-bars as to prevent them from lending too much side draft to the implement, and to provide a steadying runner or blade that is designed to support the harrow, adapt the same to run straight and prevent any tendency upon the part of the harrow of jumping or lateral wabbling.

With these objects in view my invention consists, in certain detail features of construction hereinafter described, and particularly pointed out in the claims.

Referring to the drawings: Figure 1 is a perspective view of a cultivator or harrow, constructed in accordance with my invention. Fig. 2 is a plan view thereof. Fig. 3 is a side elevation of the implement.

Like numerals indicate like parts in all the figures of the drawings.

1 designates the beam of the implement, and the same has secured to its opposite sides by staples 2, a pair of upwardly and rearwardly disposed diverging handles 3, supported near their rear ends by a pair of standards 4, whose lower ends terminate in eyes 5, embracing the opposite sides of the beam 1, and secured in position by means of a transverse bolt, 6, passing through the eyes, and rear end of the beam. The beam 1, in rear of the front ends of the handles is provided with a pair of parallel mortises or openings 7, which are disposed diagonally with relation to the beam. These mortises receive the reduced or tenoned ends 8, of a pair of laterally and forwardly disposed harrow or cultivator bars 9, which are connnected at their ends with the beam near its front end by a diagonal brace 10. The front bar 9, is provided with in this instance a series of three toothed seats or openings 11, and into the same are passed the upper or shank ends of as many cultivator or harrow teeth 12. The rear bar in this instance employs but two seats, and these are out of alignment or are located alternately with relation to those of the front harrow bar. Various forms of teeth may be employed in these cultivator bars in accordance with the the nature of the soil operated upon and the particular plant to be cultivated, so that it will be unnecessary to herein enumerate them. The undersides of the bar 9, may if desired be provided with metal re-inforcing or wear plates 13, which correspond to the two seats.

Perforations 14, and 15, arranged one in front of the other are formed in the beam 1, the latter perforation preferably occurring at the juncture of the beam and tenon 8 of the front bar are therefore passing through both the tenon and beam.

A steadying blade or runner comprising the front and rear branches 16, 17 has its upper extremities passed through the peforations 14 and 15 and above the same are threaded and secured in position by nuts. The rear branch 15, of the runner extends forward under the beam below the lower ends of the harrow or cultivator teeth, and in advance of the front branch 17, which latter, has its lower end welded to this extension. The extension constitutes a foot or point 18, it being beveled upon its upper side so as to readily penetrate the soil.

In operation the foot or runner travels in the bottom of a furrow so that it forms and is of such length as to constitute a good support for the implement as it is dragged along. It will be observed that I do not arrange or dispose the harrow or cultivator bars at a right angle to the beam but acutely with relation to the line of draft, and thus I overcome or obviate to a great extent the lateral draft that the teeth would otherwise impart to the beam, throwing the same toward the foot and from thence directly to the beam in longitudinal direction, whereby the implement will run lightly through the soil.

Having described my invention, what I claim is—

1. The combination with the longitudinal beam, the laterally disposed harrow bars and the teeth for the same, of the steadying runner comprising the front and rear branches depending from the beam, and forwardly curved under the same, where they are united in advance of the front branch forming a foot, whose point is reduced, substantially as specified.

2. The combination with the beam, the pair of diagonally disposed bars extending therefrom, and provided with teeth of the steadying runner, comprising front and rear branches, forwardly curved in line with and under the beam, and having their lower ends united in advance of the front branch, forming a foot, whose upper side is reduced to constitute a point, substantially as specified.

3. In combination with the longitudinal beam, the laterally-disposed harrow bars and the teeth for the same, the steadying runner 16 secured to the beam on a line with the harrow bars and extending forwardly and terminating in a foot, said runner having its foot depending below the plane of the teeth of the harrow bars, for the purpose set forth.

In testimony that I claim the foregoing as my own I have hereto affixed my signature in the presence of two witnesses.

THOMAS CALVIN DURHAM.

Witnesses:
A. N. ALLEN,
JOHN F. BASCOM.